March 20, 1934.　　　T. MALKOMES　　　1,951,986
REEL
Filed Nov. 4, 1929
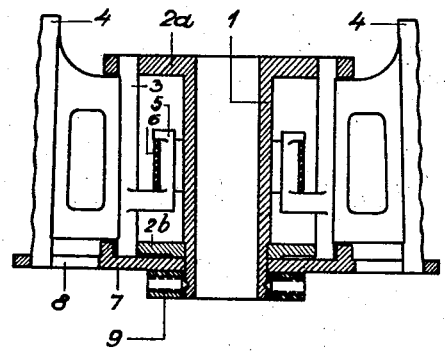
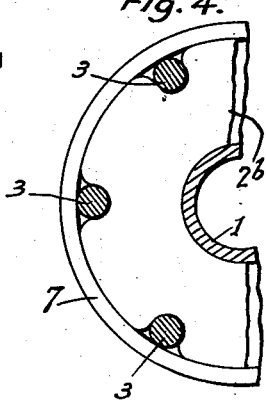
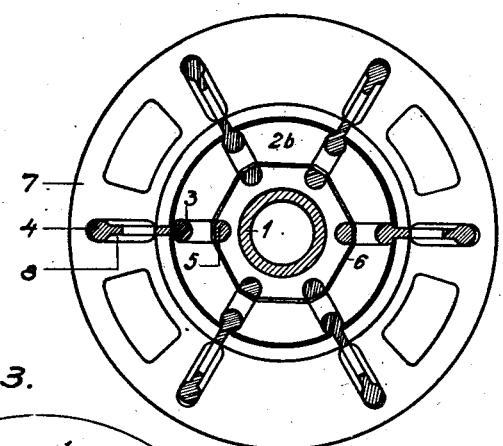
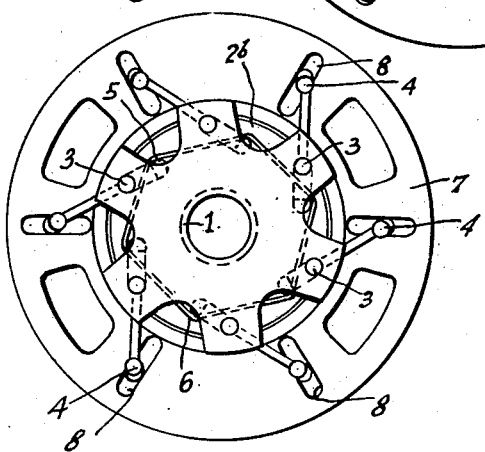
INVENTOR
Theodor Malkomes
By Maxwell Barus
Attorney Patented Mar. 20, 1934

1,951,986

UNITED STATES PATENT OFFICE 1,951,986

REEL

Theodor Malkomes, Barmen, Germany, assignor to the firm American Bemberg Corporation, Elizabethton, Tenn., a corporation of Maryland Application November 4, 1929, Serial No. 404,686
In Germany November 9, 1928

5 Claims. (Cl. 242—72)

In the centrifugal spinning method the spinning cakes obtained have to be thoroughly washed and thoroughly soaked with special liquids. With the object of preserving the shape of the spinning cake it has been proposed to introduce insertions, but these only imperfectly fulfill their purpose, a great disadvantage being, when such insertions are used, that the cakes cannot be turned and so exposed in a convenient manner to the action of the liquid.

It was also not possible to use the hitherto known reeling up devices for this purpose on account of the disadvantages referred to above.

The invention relates to an elastic reel on to which the cake after it has been formed can be easily placed and subjected to the action of washing and treating liquids and dried without the artificial silk being detrimentally affected during these operations. The reel is provided with yielding arms which allow of its circumference being considerably reduced. The artificial silk can thus be placed on it without any difficulty. According to the invention the reel consists of a hub with two discs at the ends; in these discs a number of bars are mounted so as to be rotatable therein, the bars being equidistant from the reel axis and parallel to the same. These bars act as pivots for the pivoted reel arms and support the reel arms which are approximately parallel to them and in addition carrying separate tensioning bars positioned about opposite the reel arms and facing the reel hub. The latter have an elastic band embracing them. The band seeks to hold the tensioning bars at as small a distance as possible from the reel hub. By this means the oppositely disposed arms which are fixed to the same pivots by means of limbs are held in the extended position. When subjected to radial pressure, however, they yield, turning about their pivots and stretching by means of the tensioning bars the elastic band resting on them to a greater or less extent. For causing any radial pressure to act uniformly and in order that all the arms or tensioning bars shall turn uniformly about their pivots a disc is provided at the end of the hub, which is capable of being rotated coaxially to the latter and is provided with radial slots for guiding the ends of the arms. On this disc being turned with respect to the hub, the arms which are guided in the slots will be turned inwards about their pivots, the elastic band being at the same time tensioned by the outwardly turning tensioning bars. If, on the other hand, a radial pressure does not act on all the arms, the guide disc will be turned by the guiding slots through the arms which are acted on being turned about their pivots. The remainder of the arms which are not acted on are thereby moved by means of the turned guide disc also by the same amount in the radial direction.

The device has the advantage of great simplicity, springs, locking means and similar devices being entirely obviated, so that it can be made from cheap acid-proof material, such as hard rubber or artificial resin. A further advantage consists in this, that the rubber band which serves the purpose of elastic adjustment is not only acid-proof but can be renewed at any time and finally that by using bands of different strength, any desired tension, which is frequently only small, can be obtained. The spinning cake or hank is placed in position, the circumference of the reel being first so far reduced by means of the guide disc that the cake or the hank can be conveniently slipped on. The cake or hank can very easily be washed on the reel, as the latter can be moved during the washing operation, thus assisting the treating liquid to penetrate. After the wet treatment has been completed the artificial silk can be dried on the reel itself as during the consequent contraction the arms yield sufficiently to prevent undue straining or stretching.

In the accompanying drawing a constructional example of the invention is shown,

Fig. 1 being a cross-section along the reel axis and

Fig. 2 a section at right angles to the reel hub.

Figs. 1 and 2 show the reel in the extended position.

Fig. 3 is a plan view of the partially collapsed reel.

Figure 4 is an enlarged detail view showing the pivotal relation of the arms of the device and the hub plate.

On the reel hub 1 are mounted the two discs 2a and 2b. In these discs the pivots 3 are rotatable. The pivots 3 support the outside arms 4 which are parallel or slightly inclined to them and about opposite to them and facing the reel hub tensioning bars 5. On the latter is laid an elastic band, for instance a rubber band 6. The ends of the arms 4 engage in radially extending slots 8 in a tensioning disc 7 which is rotatable about the reel axis. Finally there is fixed on the reel hub 1 a disc 9 for securing the guide disc 7 against axial displacement.

When the guide disc 7 is turned on the reel hub, the arms 4 slide in the guiding slots 8, turning about the pivots 3. The tensioning bars are at the same time moved outwards, tensioning the rubber band which rests on them. The same movements are transmitted by the guide disc, when through radial pressure on one or more of them the arms are moved in the slots of the guide disc towards the reel axis.

What I claim is:

1. A reel comprising a hub part, discs fixed at the ends of the hub part, arms pivoted in the said discs, bars mounted on the arms between their pivots and the hub axis, which are parallel to the said pivots, and an elastic band embracing the said bars, for imparting a radial motion to the said arms.

2. A reel comprising a hub part, discs fixed at the end portions of the hub part, arms pivoted in the said discs, bars mounted on said arms between their pivots and the hub axis, which bars are parallel to the said pivots, an elastic band embracing the said bars and adapted to impart a radial motion to said arms, a disc rotatable on the hub part and provided with radial slots adapted to receive the ends of the arms.

3. A carrier, comprising a hub part, a plurality of arms pivoted intermediate their ends in the arc of a circle concentric with said hub, carrier arms supported by the outer end portions of said arms, a disc concentric with said hub and having slots positioned to receive portions of said arms so as to simultaneously change the effective diameter of the group of carrier arms upon rotation of said disc relative to said hub, and resilient means connected with the inner end portions of said arms to resist rotation of the levers around their pivots.

4. A carrier, comprising a hub part, a plurality of arms pivoted intermediate their ends at spaced points about said hub and having lugs projecting from their inner end portions, carrier arms supported by the outer end portions of said arms, and a resilient band embracing said lugs and adapted to resist movement of said arms about their pivots to decrease the effective diameter of the carrier.

5. A carrier for supporting a spinning cake in the treating of freshly precipitated artificial silk, comprising a hub, a plurality of discs fixed to said hub, a plurality of pivoted arms carried by said discs and adapted to swing in planes substantially at right angles to said hub about points intermediate their ends, said arms having lugs projecting from their inner end portions substantially parallel to the hub, carrier arms supported at the outer end portions of the pivoted arms, and a rubber band embracing the lugs on said arms and adapted to resist movement of said levers about their pivots so as to decrease the effective diameter of the carrier.

THEODOR MALKOMES.